J. O. NEIKIRK.
COMBINATION CENTER AND SIDE DUMP CAR.
APPLICATION FILED AUG. 6, 1917.

1,405,149.

Patented Jan. 31, 1922.

Witnesses:

Inventor:
John O. Neikirk
By Wilkinson & Huxley
Attys.

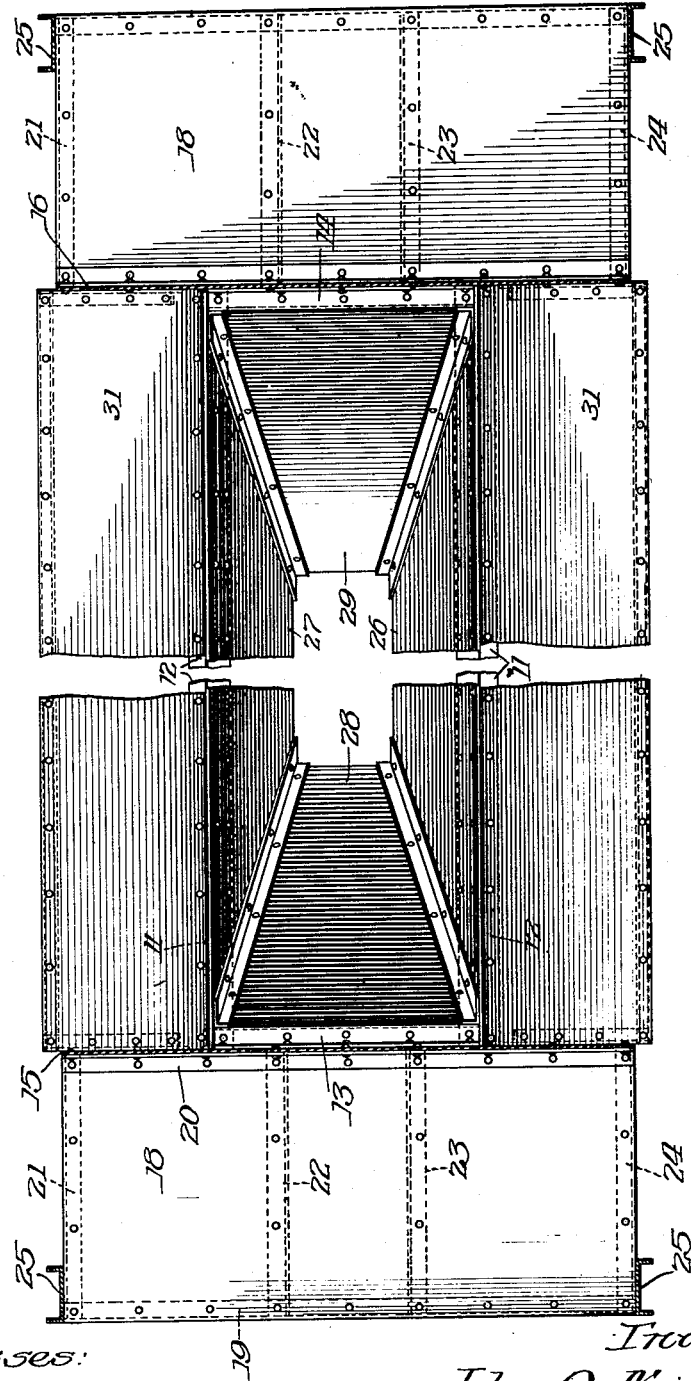

UNITED STATES PATENT OFFICE.

JOHN O. NEIKIRK, OF LOMBARD, ILLINOIS, ASSIGNOR TO RODGER BALLAST CAR COMPANY, A CORPORATION OF MAINE.

COMBINATION CENTER AND SIDE DUMP CAR.

1,405,149.     Specification of Letters Patent.     Patented Jan. 31, 1922.

Application filed August 6, 1917. Serial No. 184,599.

*To all whom it may concern:*

Be it known that I, JOHN O. NEIKIRK, a citizen of the United States, and resident of Lombard, in the county of Du Page and State of Illinois, have invented certain new and useful Improvements in a Combination Center and Side Dump Car, of which the following is a specification.

This invention relates to dump cars, and more particularly to combination center and side dump cars.

One of the objects of this invention is to facilitate the unloading of cars.

Another object is to simplify dump cars of the type which may be unloaded by center and side dump action.

Another object is to construct the frame of the car in a manner to effectively withstand pulling and buffing strains.

Another object is to provide a simple and compactly arranged dump car having novel means whereby the load may be dumped centrally or to either side and adapted to meet the various requirements for successful commercial operation.

These and other objects are accomplished by providing a dump car having a novelly constructed body with a movable floor whereby the car may be unloaded, and a door in the floor whereby the car also may be unloaded.

The invention is illustrated on the accompanying sheets of drawings, in which.

Figure 1:
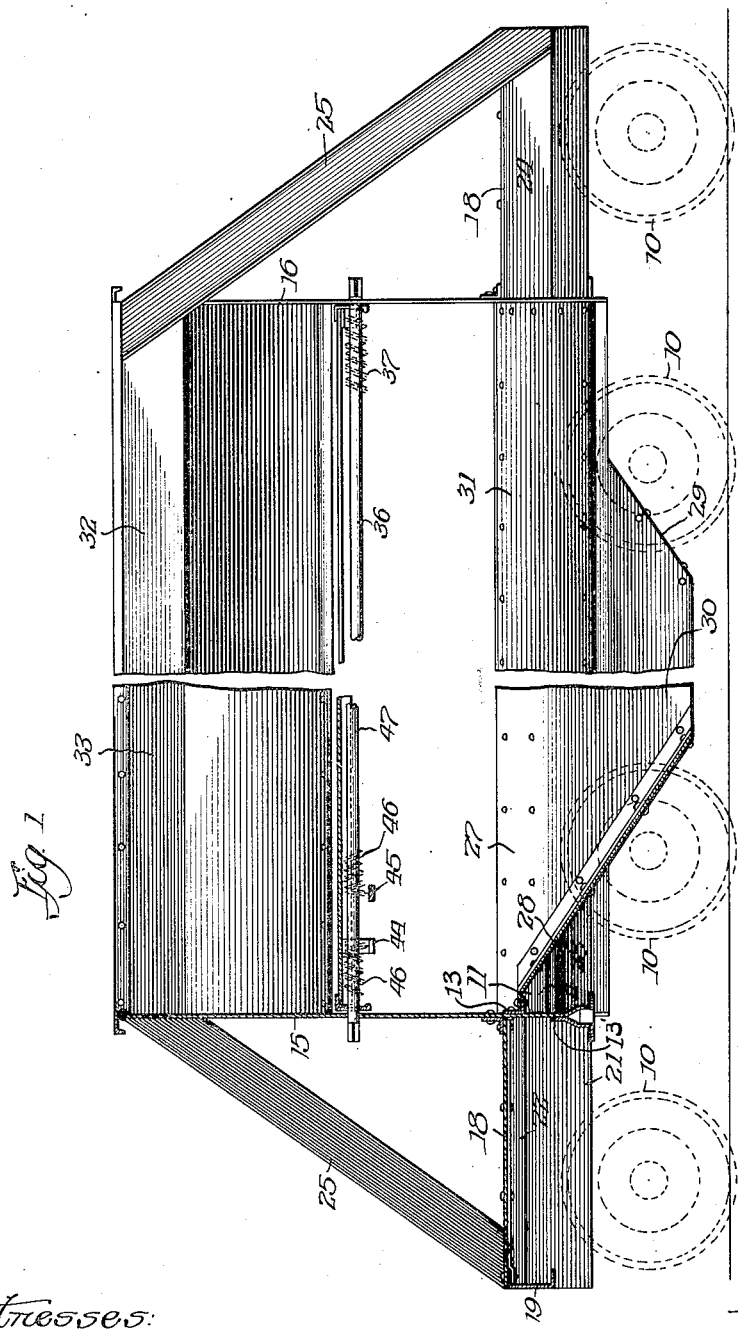
Fig. 1 is a fragmentary side elevation of my dump car.

The various novel features of my invention will be apparent from the following description and drawings, and will be particularly pointed out in the appended claims.

The frame of this car, which is supported upon suitable trucks, the wheels of which are designated by the reference 10, is constructed to effectively resist pulling and buffing strains and includes two main side channel members 11 and 12 which are connected at their ends by cross members 13 and 14 to the bolsters 13', and to which are respectively connected the end walls 15 and 16 of the body portion 17 of the car. Secured to the end walls of the body portion 17 are end frame portions 18, including transversely extending end sills 19 and 20 which are connected by longitudinally extending bars 21—22—23 and 24 with the bolsters. The outer ends of the frame portions 18 are connected to the main body of the car by upwardly and inwardly inclined supporting channels 25. There is one set of these channels at each end of the car and the sets converge upwardly toward each other. This frame structure presents a stiff combination of parts for effectively resisting pulling and buffing strains.

Secured to the side channel members 11 and 12 are downwardly converging and curved sides 26 and 27 of a permanent centrally arranged hopper, the end members 28 and 29 of which are connected to the frame members 13 and 14 respectively and converge downwardly toward the center of the car, said side and end hopper members terminating in a central opening 30 for guiding a centrally dumped load between the tracks. Also secured to each of the side channels 11 and 12 and to the end walls 15 and 16 of the body of the car is a sidewardly and downwardly extending guide chute 31 for guiding a dumped load to either side of the car.

The side portions 32 and 33 of the body of the car extend vertically and then converge downwardly toward each other forming a hopper-like structure over the guide chutes. The floor 34 of the flat bottom car includes a door frame structure which is mounted for a swinging movement about two supports 35 and 36 for dumping the load outwardly to either side of the car. The dumping of the load by inclining the floor or giving the floor a pivotal movement is controlled by suitable actuation of the supports 35 and 36 around which chains 37 pass, said chains being secured to side portions of the floor.

Figure 3:
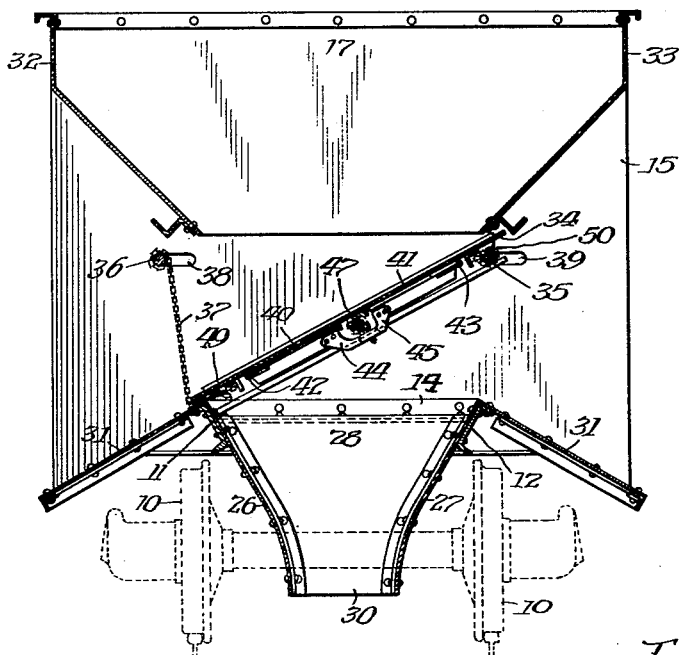
Fig. 3 is a similar sectional view showing the movable floor swung from its normal position for side dumping, and, Fig. 4 is a plan view, parts being in section, showing the frame construction and also the stationary dumping guide portions.

As shown in Fig. 3, the floor 34 has been swung about its right hand pivotal support 35 to dump the load outwardly over the left hand side guide chute 31 to the left side of the car. Under these conditions it will be noted that the support 36 is moved to its outer limit in the slots 38 formed in the end walls 15 and 16 of the body of the car, the other support 35 being at the inner extremity of similar slots 39 formed in the end walls of the body of the car. Likewise the load may be dumped to the right of the car by swinging the floor 34 of the car about its left hand pivotal support 36, whereupon the load will pass from the body of the car outwardly over the floor 34 of the car and over the right hand side guide chute 31.

Not only can the load be dumped outwardly to either side of the car, but also it may be dumped inwardly centrally with respect to the car. In order to accomplish this result the floor of the car is provided with oppositely arranged doors 40 and 41 which are hinged at 42 and 43 to a part of the floor or door frame structure and are arranged to swing downwardly to dump the load into the centrally arranged chute which guides the dumping material between the tracks. The doors 40 and 41 are provided with brackets 44 and 45 respectively to which are connected chains 46 which are wound around the centrally arranged shaft 47 carried by the main center beam of the floor of the car. Normally the doors 40 and 41 are held in a horizontal position, but may be moved to the dotted line position shown in Fig. 2 for central dumping by an actuation of the shaft 47.

Figure 2:
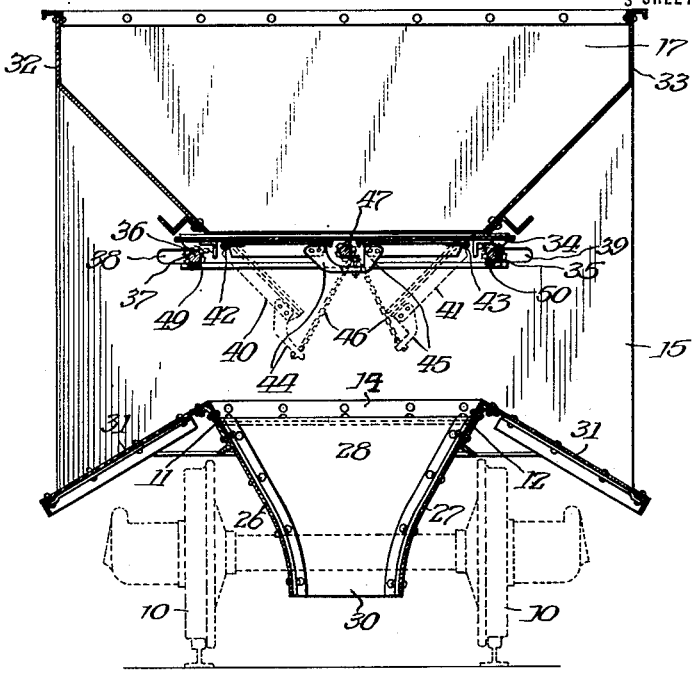
Fig. 2 is a sectional view showing the general arrangement of the dumping parts, the doors in the floor being shown open in their dotted line positions for central dumping.

It will be noted by an inspection of Fig. 2 that the floor of the car, when in its normal position, is retained in such position by the side rods or supports 35 and 36 occupying recesses 49 and 50 formed in the floor structure.

By means of this arrangement it is seen that the floor or the door frame may be inclined or swung about either of its pivotal supports for dumping outwardly to either side of the car, or the load may be dumped inwardly centrally by permitting the floor to remain in its normal horizontal position and causing a downward actuation of the doors independent of the floor or door frame. It will be understood that the floor and doors are returned to their normal positions by rotating their corresponding rotatable shafts.

It is evident that there may be various modifications of the invention herein particularly shown and described, and it is my intention to cover all such modifications which do not involve a departure from the spirit and scope of the invention as set forth in the following claims.

I claim:

1. A car having a flat bottom comprising a door frame and doors arranged to incline to either side to dump a load outwardly, said doors being arranged to drop independently of the frame to discharge the load inwardly.

2. In a dump car, the combination of a body having a unitarily movable floor whereby the load may be dumped, and a door in the floor whereby the load also may be dumped.

3. In a dump car, the combination of a body having a floor member composed of doors and movable in different directions for dumping a load in different directions.

4. In a dump car, the combination of a body having a floor composed of doors and mounted for pivotal movement in different directions whereby the load may be dumped to either side of the car.

5. In a dump car, the combination of a body having a floor mounted for pivotal movement in different directions whereby the load may be dumped to either side of the car, and a door in the floor whereby the load may be dumped centrally.

6. In a dump car, the combination of a body having a floor composed of a plurality of dump doors, and pivotal mountings for said floor on either side thereof whereby the floor may be moved in different directions to dump the load to either side of the car.

7. In a dump car, the combination of a body having a floor, pivotal mountings for said floor on either side thereof whereby the floor may be moved in different directions to dump a load to either side of the car, and oppositely arranged doors carried by said floor for dumping the load centrally.

8. In a dump car, the combination of a body having a stationary floor frame with recessed portions, and straight members normally mounted within said portions to hold the floor in a given position, said floor being pivotally mounted about either of said members for dumping a load to either side of the car.

9. In a dump car, the combination of a body having a floor with recessed portions, members normally engaging said portions to hold the floor in a given position, said floor being pivotally mounted about either of said supports for dumping a load to either side of the car, and a door in said floor whereby the load may be dumped centrally.

10. In a dump car, the combination of a frame, oppositely arranged side chute members secured to said frame, and a body secured to said frame and having a movable floor composed of dump doors and which may be swung to either side for directing a load over either of said side chute members for side dumping.

11. In a dump car, the combination of a frame, side chute members supported thereby, a body supported by said frame and having a pivotally mounted floor composed of dump doors and which is movable into the planes of either of said side chute members to direct a load thereover for dumping to either side of the car.

12. In a dump car, the combination of a frame, central and side chute members supported thereby, a body supported by the frame and having a floor movable in different directions to direct a load over either of said side chute members to either side of said car, and a door carried by said floor whereby a load may be directed into the central chute member for central dumping.

13. In a dump car, the combination of a frame, central and side chute members supported thereby, a body carried by the frame having a floor pivotally mounted for movement in opposite directions whereby a load may be directed over either of said side chute members, and oppositely arranged doors in the floor for directing the load into the central chute for central dumping.

14. In a dump car, the combination of a body having a hopper portion and side frame members, and central and side chute members supported by said members below said hopper portion for directing a discharged load to either side of the car or centrally with respect thereto.

15. In a dump car, the combination of side frame members, outwardly and downwardly diverging side chute members connected thereto, and a central chute having downwardly converging members secured to the side frame members whereby a dumped load may be directed to either side of the car or centrally with respect thereto.

16. In a dump car, a body with a hopper portion and a frame having longitudinally extending side frame members, a central chute below the hopper portion having four downwardly converging sides, and downwardly and outwardly diverging side chute members secured to said frame members whereby a dumped load may be directed centrally with respect to the car or to either side thereof.

17. In a dump car, the combination of a frame, central and outwardly directed side chute members supported thereby, a body supported by the frame and comprising means for discharging the load through said central chute or over either of said side chute members.

Signed at Chicago, State of Illinois, this 27th day of July, 1917.

JOHN O. NEIKIRK.

Witnesses:
C. E. JORGENSEN,
JOHN S. MAURER.